(12) United States Patent
Qi et al.

(10) Patent No.: US 11,568,751 B2
(45) Date of Patent: Jan. 31, 2023

(54) DYNAMIC PLATOON FORMATION METHOD UNDER MIXED AUTONOMOUS VEHICLES FLOW

(71) Applicant: ZHEJIANG UNIVERSITY, Hangzhou (CN)

(72) Inventors: Hongsheng Qi, Hangzhou (CN); Yuyan Ying, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 55 days.

(21) Appl. No.: 17/244,987

(22) Filed: Apr. 30, 2021

(65) Prior Publication Data
US 2022/0351625 A1 Nov. 3, 2022

(30) Foreign Application Priority Data
Apr. 14, 2021 (CN) .......................... 202110402033.9

(51) Int. Cl.
| | |
|---|---|
| *G08G 1/00* | (2006.01) |
| *B60W 60/00* | (2020.01) |
| *B60W 40/06* | (2012.01) |
| *B60W 30/18* | (2012.01) |
| *G08G 1/052* | (2006.01) |

(52) U.S. Cl.
CPC ......... *G08G 1/22* (2013.01); *B60W 30/18163* (2013.01); *B60W 40/06* (2013.01); *B60W 60/0027* (2020.02); *G08G 1/052* (2013.01); *G08G 1/20* (2013.01); *B60W 2520/10* (2013.01); *B60W 2554/4042* (2020.02)

(58) Field of Classification Search
CPC ............ G08G 1/22; G08G 1/052; G08G 1/20; B60W 60/0027; B60W 30/18163; B60W 40/06; B60W 2554/4042; B60W 2520/10
See application file for complete search history.

(56) References Cited

U.S. PATENT DOCUMENTS

| | | | | |
|---|---|---|---|---|
| 2008/0147319 | A1* | 6/2008 | Cubillo ................. | G01C 21/32 701/431 |
| 2010/0110105 | A1* | 5/2010 | Kinnunen .......... | G01C 21/3664 345/629 |
| 2012/0166076 | A1* | 6/2012 | Hardy ................ | G01C 21/3415 701/414 |
| 2014/0277888 | A1* | 9/2014 | Dastoor .................... | B60L 3/12 701/22 |
| 2016/0019434 | A1* | 1/2016 | Caldwell ................ | G06V 40/23 345/474 |

(Continued)

*Primary Examiner* — Hussein Elchanti
(74) *Attorney, Agent, or Firm* — . W&G Law Group (57) ABSTRACT

A dynamic platoon formation method under a mixed autonomous vehicles flow is provided. The method implements dynamic platooning by taking into account a fact that a traffic flow is a mixture of HDVs and CAVs. The dynamic platoon formation method includes: selecting lanes as candidate lanes in turn; constructing a decision tree from a current moment to a moment of platoon formation according to the following process: constructing a decision space for each CAV, generating a compatible decision set, selecting and executing a compatible decision, and updating location and speed information of all vehicles; and selecting, according to a predetermined index (including TTP and DTP), an optimal decision sequence as a decision sequence corresponding to the candidate lane.

5 Claims, 5 Drawing Sheets

(56) References Cited

U.S. PATENT DOCUMENTS

| | | | | |
|---|---|---|---|---|
| 2016/0154538 A1* | 6/2016 | Wang | ................ | G01C 21/3664 |
| | | | | 715/771 |
| 2018/0299284 A1* | 10/2018 | Wang | ................ | G01C 21/3694 |
| 2019/0170527 A1* | 6/2019 | Inoue | ................ | G01C 21/26 |
| 2019/0206254 A1* | 7/2019 | Tao | ................ | B60W 50/14 |
| 2020/0020227 A1* | 1/2020 | Ran | ................ | G08G 1/075 |
| 2020/0020234 A1* | 1/2020 | Cheng | ................ | G08G 1/0112 |
| 2020/0207343 A1* | 7/2020 | Vassilovski | ................ | H04W 4/44 |
| 2020/0239031 A1* | 7/2020 | Ran | ................ | G08G 1/0145 |
| 2020/0365033 A1* | 11/2020 | Cheng | ................ | G08G 1/161 |
| 2020/0388161 A1* | 12/2020 | Kim | ................ | G08G 1/096791 |

\* cited by examiner

DYNAMIC PLATOON FORMATION METHOD UNDER MIXED AUTONOMOUS VEHICLES FLOW

TECHNICAL FIELD

The present disclosure belongs to the technical field of autonomous driving, and relates to a dynamic platoon formation method under a mixed autonomous vehicles flow. Specifically, the present disclosure relates to a method for enabling autonomous vehicles traveling in different lanes to form a platoon in one lane in a mixed traffic flow of human driven vehicles (HDVs) and connected autonomous vehicles (CAVs).

BACKGROUND

Autonomous driving is becoming increasingly common to the public. The composition of traffic flows gradually changes from total HDVs to a mixture of HDVs and CAVs, and then to total CAVs. In the foreseeable future, autonomous vehicles will be a main part of traffic flows.

Platooning is one of operation modes of autonomous vehicles. In the platooning process, the autonomous vehicles form a tight platoon. A short distance is maintained between adjacent autonomous vehicles. The benefit of platooning is obvious: the energy consumption of the vehicles is greatly reduced due to the reduction in wind resistance.

When a traffic flow consists of pure autonomous vehicles, all vehicles are under control and it is easy to form a platoon. However, in the mixed traffic flow, HDVs are not under control. Therefore, when the dispersed autonomous vehicles form a platoon, the actions of HDVs need to be considered. The designed platoon formation method can work properly only if the actions of HDVs are taken into account.

SUMMARY

To overcome the problem that the mixed traffic flow is not taken into account in the existing technology, the present disclosure provides a dynamic platoon formation method under a mixed autonomous vehicles flow.

The present disclosure is implemented by the following technical solutions:

sending and receiving communication signals among autonomous vehicles, to form a platoon request;

obtaining road information and dynamic information of all vehicles, where the road information includes a lane distribution, and the dynamic information of all vehicles includes location and speed information of each human driven vehicle and each autonomous vehicle; and in a case of only one lane, forming no platoon in a mixed state and ending the method;

predetermining an index for evaluating a platooning scheme, where the index includes at least one of a time to platoon (TTP) or a distance to platoon (DTP), and where the time to platoon means a duration from a moment of the platoon request to a moment of forming the platoon, and the distance to platoon means a distance traveled by a leading vehicle from a moment of sending the platoon request to the moment of forming the platoon;

in a case of multiple lanes, selecting lanes as candidate lanes for platoon in turn according to a certain sequence (for example, from left to right), wherein a final platoon is formed on one of the candidate lane;

performing a following loop for each candidate lane for platoon in sequence to generate a decision tree corresponding to the candidate lane for platoon, where the loop includes: constructing a decision space for each autonomous vehicle, constructing a compatible decision set, selecting and executing one compatible decision, and predicting a traffic flow state (that is, obtaining locations and speeds of all the vehicles) after the compatible decision is executed, and updating the decision space for each autonomous vehicle, and where a root node of the decision tree is a traffic flow state at a current moment (the moment of platoon request); each branch represents a system state transfer after the compatible decision is executed by one or more vehicles; a terminal node represents a platoon formation; each branch from the root node to the terminal node represents a decision sequence in a process of the platoon formation; and an optimal decision sequence corresponding to the candidate lane for platoon may be selected according to a predetermined index (for example, a minimum TTP or DTP);

performing the foregoing decision tree generating process for all the candidate lanes for platoon, to obtain respective optimal decision sequences corresponding to the candidate lanes for platoon; and selecting, according to the predetermined index (such as the TTP or the DTP), an optimal decision sequence (for example, a decision sequence with the minimum TTP or minimum DTP) from all the optimal decision sequences as a platooning scheme, where the selected platooning scheme serves as a final execution scheme, and the candidate lane for platoon corresponding to the final execution scheme is a target lane for platoon.

The present disclosure has the following beneficial effects:

The method according to the present disclosure takes the mixed traffic flow of HDVs and CAVs into consideration, and therefore is more in line with actual situations and is widely applicable.

DETAILED DESCRIPTION

The following further describes the present disclosure in detail with reference to the accompanying drawings and embodiments.

Figure 1:
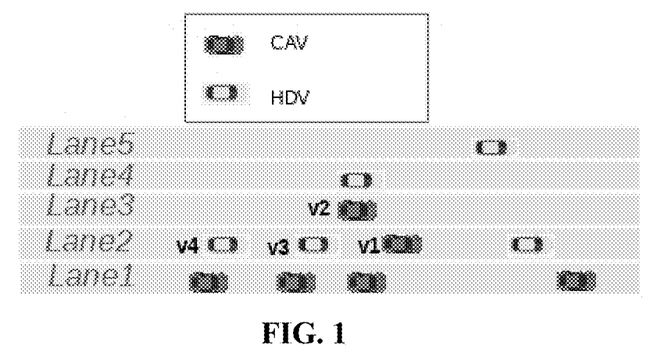
FIG. 1 shows the application scenario of the dynamic platooning.

FIG. 1 represents an instance of an application scenario of the dynamic platooning. A scenario example of a mixed traffic flow is shown in FIG. 1. In FIG. 1, CAV represents a connected autonomous vehicle, and HDV represents a human driven vehicle. HDVs and CAVs are mixed. The CAVs intend to form a platoon. Five lanes in the instance are shown in FIG. 1. The final platoon may form on any lane. As lanes for platoon, different lanes require different TTPs and DTPs. Therefore, an optimal lane for platoon needs to be selected.

Figure 2:
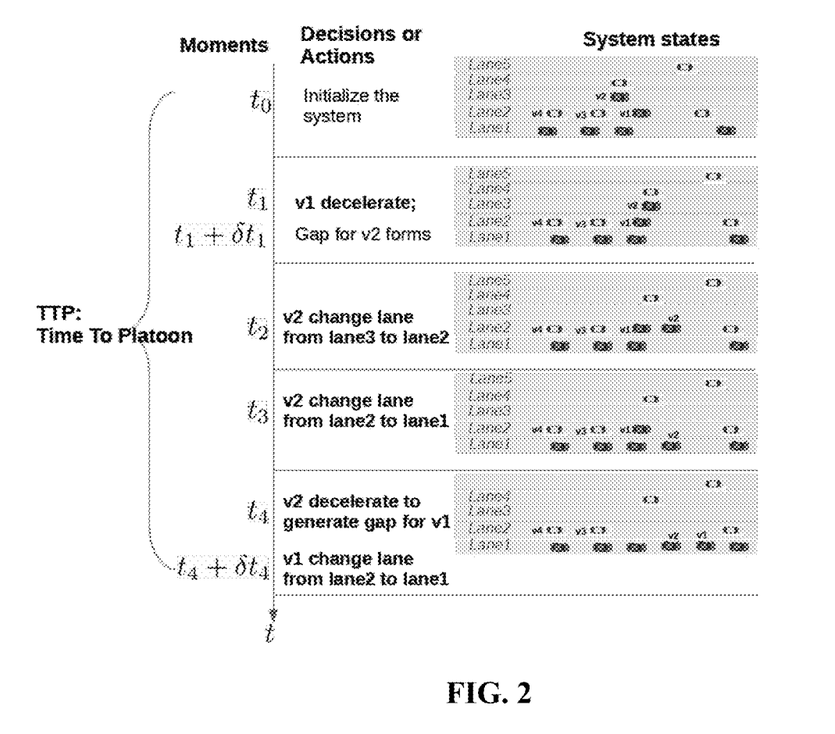
FIG. 2 shows a platooning process example.

FIG. 2 shows a platooning process example. Lane 1 is selected as a candidate lane for platoon. At an initial moment, that is, a moment $t_0$, a traffic flow state is the same as that in FIG. 1. Due to a certain space ahead of the vehicle v1, one decision of the vehicle v1 is to decelerate, to create a relatively large feasible gap for vehicle v2. At a moment $t_1$, the vehicle v1 decelerates, and a deceleration duration is $\delta t_1$. Till a moment $t_1+\delta t_1$, a feasible gap prepared for the vehicle v2 is formed. The vehicle v2 changes from lane 3 to lane 2 at a moment $t_2$, and then changes from the lane 2 to the lane 1 at a moment $t_3$. The vehicle v2 starts to decelerate at a moment $t_4$, to create a feasible gap for vehicle 1. The gap is formed at a moment $t_4+\delta t_4$, and the vehicle v1 changes to lane 1. Therefore, a platoon is formed.

In the platooning scheme in FIG. 2, the TTP is equal to $t_4+\delta t_4-t_0$. The DTP is a distance traveled by a leading vehicle of the platoon in a period $[t_0, t_4+\delta t_4]$.

The platooning process in FIG. 2 is merely an example. To design a general platooning process, the following factors need to be considered: (1) a feasible decision space DS(i) for each CAV i, which includes an acceleration action, a deceleration action, and a lane change action; (2) a spatial-temporal trajectory for lane change of the CAV; (3) when the CAV does not have a feasible lane changing gap, other CAVs need to decelerate cooperatively (considering the fact that the front vehicle may be an HDV that is not under control, the spacing with the front vehicle needs to be taken into account if the current vehicle accelerates, which makes the situation complicated; however, it is unnecessary to consider the type of the front vehicle if the current vehicle decelerates, as long as the action of the affected vehicle behind is updated); a vehicle that decelerates to create a gap is referred to as a cooperative vehicle, and cooperative optimization is performed on a deceleration curve of the cooperative vehicle and a trajectory of the lane-changing vehicle; and (4) the behavior of the HDV, namely, a following behavior.

Figure 3:
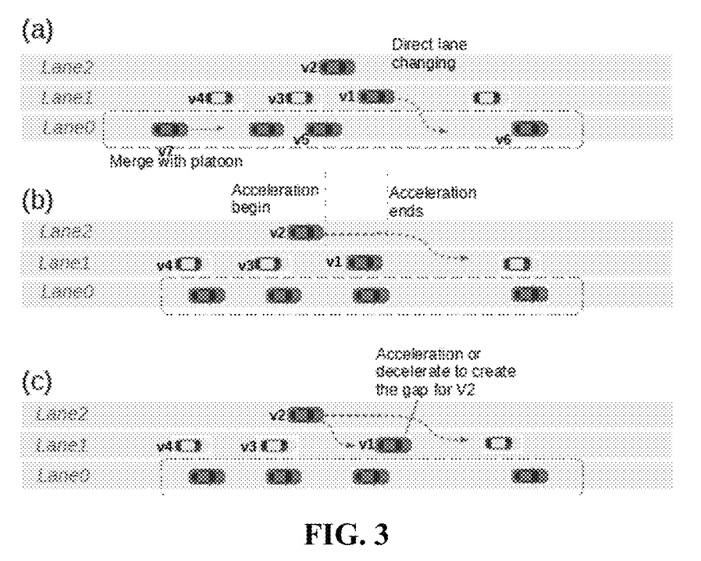
FIG. 3 shows a decision space of the CAV.

First, it is assumed that serial numbers of lanes from right to left are $\{l_0, l_1, l_2, l_3 \ldots l_{N_j}\}$, and the number of lanes is $N_l$. $l_0$ is the rightmost lane, and $l_{N_l}$ is the leftmost lane. The candidate lane for platoon is $l_{TARGET} \in \{l_0, l_1, l_2, l_3 \ldots l_{N_j}\}$, that is, TARET $\in \{0,1,2 \ldots N_l\}$. At a moment t, a longitudinal location of vehicle i is $x_{i,l_j}(t)$, and the subscript $l_j$ represents that the vehicle is located at lane $l_j$. The vehicle type is type$_i \in \{CAV, HDV\}$. CAV represents a connected autonomous vehicle and HDV represents a human driven vehicle. Without loss of generality, it is assumed that vehicle i is a CAV, and a decision space for vehicle i includes the following categories: merge with an existing platoon in the same lane (MERGE) (The merge process can be implemented by the method in Porfyri, KN., Mintsis, E., and Mitsakis, E. (2018). Assessment of ACC and CACC systems using SUMO. EPIC Series in Engineering 2, 82-93.), direct lane change (LC), accelerate lane change (ALC) or decelerate lane change (DLC), and decelerating to cooperate with the lane change of other vehicles (i.e., DGP, which means "decelerate gap provide"). Scenarios corresponding to the four decisions are as shown in FIG. 3. In each scenario in FIG. 3, the target lane is Lane0. As shown in (a) of FIG. 3, a vehicle v7 is already in the target lane, but has not merged with the platoon in the target lane yet. Therefore, the vehicle v7 needs to accelerate to merge with the existing platoon (MERGE). Vehicle v1 can directly change lane if the gap between the vehicles v5 and v6 is large enough, which corresponds to the second decision (LC). As shown in (b) of FIG. 3, the gap between the vehicles v3 and v1 is too short for the vehicle v2, but the gap ahead of the between the vehicles v1 is large enough. Therefore, the vehicle v2 may accelerate and then change lane, which corresponds to the third decision (ALC and DLC). As shown in (c) of FIG. 3, the gaps ahead and behind the vehicle v1 do not meet the lane change requirement of the vehicle v2; in this case, v1 may accelerate to increase the gap behind the vehicle v1, or decelerate to increase the gap ahead the vehicle v1. This corresponds to the fourth decision, i.e., decelerating to cooperate with lane change of other vehicles (DGP). When a possible decision is LC, ALC or DLC, lane changing feasibility analysis needs to be performed, and the decision can be executed only if the feasible condition is satisfied.

At the moment t, assuming that all CAVs send lane change requests and the target lane is j, a process of screening the decision space $\mathbb{DS}_t = \{DS_t(\bullet)\}$ for all the vehicles is as shown in

TABLE 1

| | |
|---|---|
| Input | Lanes number $N_l$, and pre-specified target lane j; |
| | The location of each vehicle, including CAV and HDV; |
| | The existing platoon, VEHPLATOON, which is a set; It is an empty set or only contain the leading CAV in lane j; |
| Output | The decision space $DS_t(i)$ for each CAV i; |
| 1 | Stage 0: Initialize decision space DS(•) |
| 2 | For each CAV i, DS(i)={} |
| 3 | Stage 1: Get the decision space for CAVs in target lane |
| 4 | For each CAV i ∉ VEHPLATOON |
| 5 | DS(i) = {MERE }; |
| 6 | VEHPLATOON = VEHPLATOON ∪ i |
| 7 | For each CAV i in lane $l_j$ |
| 8 | |
| 9 | If ∃ CAV k in $l_{j-1}$ $x_{k,l_{j-1}} < x_{i,l_j}$ and ∄ m , |
| 10 | $x_{m,l_{j-1}} < x_{i,l_j}$ and $x_{k,l_{j-1}} < x_{m,l_{j-1}}$ |
| 11 | DS(i) = DS(i) ∪ {DP $_k$}, subscript k means decelerate to provide gap for vehicle k; |
| 12 | |
| 13 | DS(k) = DS(k) ∪ {ALC$_i$}, subscript i means change lane to the gap ahead of vehicle i; |
| 14 | |
| 15 | If ∃ CAV k in $l_{j+1}$ , $x_{k,l_{j+1}} < x_{i,l_j}$ and ∄ m , |
| 16 | $x_{m,l_{j+1}} < x_{i,l_j}$ and $x_{k,l_{j+1}} < x_{m,l_{j+1}}$ |
| 17 | DS(i) = DS(i) ∪ {DP $_k$} |
| 18 | DS(k) = DS(k) ∪ {ALC$_i$}, subscript i means change lane to the gap ahead of vehicle i; |
| 19 | |
| 20 | |
| 21 | If ∃ CAV k in $l_{j-1}$ , $x_{k,l_{j-1}} > x_{i,l_j}$ and ∄ m , |
| 22 | $x_{m,l_{j-1}} > x_{i,l_j}$ and $x_{k,l_{j-1}} > x_{m,l_{j-1}}$ |
| 23 | DS(i) = DS(i) ∪ {DP $_k$} |
| 24 | DS(k) = DS(k) ∪ {DLC$_i$}, subscript i means change lane to the gap ahead of vehicle i; |
| 25 | |
| 26 | |
| 27 | If ∃ CAV k in $l_{j+1}$ , $x_{k,l_{j+1}} > x_{i,l_j}$ and ∄ m , |
| 28 | $x_{m,l_{j+1}} > x_{i,l_j}$ and $x_{k,l_{j+1}} > x_{m,l_{j+1}}$ |
| 29 | DS(i) = DS(i) ∪ {DP $_k$} |
| 30 | DS(k) = DS(k) ∪ {DLC$_i$}, subscript i means change lane to the gap ahead of vehicle i; |
| 31 | |
| 32 | Stage 2: Get the decision space for CAVs in non-target lane |
| 33 | |
| 34 | For each CAV i on each lane $l_k$, k > j, k ∈ {0~$N_l$} |
| 35 | |
| 36 | If i ∥- LCF* |

TABLE 1-continued

| | |
|---|---|
| 37 | DS(i) = DS(i) ∪ {LC} |
| 38 | If ∃ CAV q in $l_{k+1}$, $x_{q,J_{k+1}} > x_{i,J_k}$ and ∄ CAV m, |
| 39 | $x_{m,J_{k+1}} > x_{i,J_k}$ and $x_{q,J_{k+1}} > x_{m,J_{k+1}}$ |
| 40 | DS(i) = DS(i) ∪ {DP $_q$}; |
| 41 | DS(q) = DS(q) ∪ {DLC$_i$}; |
| 42 | If ∃ CAV q in $l_{k+1}$, $x_{q,J_{k+1}} < x_{i,J_k}$ and |
| 43 | |
| 44 | ∄ CAV m, $x_{m,J_{k+1}} < x_{i,J_k}$ and $x_{q,J_{k+1}} < x_{m,J_{k+1}}$ |
| 45 | |
| 46 | DS(i) = DS(i) ∪ {DP $_q$}; |
| 47 | DS(q) = DS(q) ∪ {ALC$_i$}; |
| 48 | For each CAV i on each lane $l_k$, k < j, k ∈ {0~N$_l$} |
| 49 | If i ‖- LCF* |
| 50 | DS(i) = DS(i) ∪ {LC} |
| 51 | If ∃ vehicle q in $l_{k-1}$, $x_{q,J_{k-1}} > x_{i,J_k}$ and ∄ m, |
| | $x_{m,J_{k-1}} > x_{i,J_k}$ and $x_{q,J_{k-1}} > x_{m,J_{k-1}}$;<br>DS(i) = DS(i) ∪ {DP $_q$};<br>DS(q) = DS(q) ∪ {DLC$_i$};<br>If ∃ vehicle q in $l_{k-1}$, $x_{q,J_{k-1}} < x_{i,J_k}$ and ∄ m,<br>$x_{m,J_{k-1}} < x_{i,J_k}$ and $x_{q,J_{k-1}} < x_{m,J_{k-1}}$<br>DS(i) = DS(i) ∪ {DP $_q$};<br>DS(q) = DS(q) ∪ {ALC$_i$}; |

In table 1, i LCF means that CAV i satisfies the lane changing feasible condition.

According to the foregoing process, at any moment t, after information of all vehicles is obtained, a decision space $\mathbb{DS}_t$ for any CAV can be constructed. A platoon formation process may be considered as a loop of a series processes including selecting a compatible decision from the decision space $\mathbb{DS}_t$ (each compatible decision is a set of decisions that are executed by one or more CAVs and do not conflict with each other), executing the decision, updating a state of each vehicle, constructing a decision space DS$_t$(•) again, and the like, until all the vehicles join the platoon (full platoon forms). All the compatible decisions are expressed as a compatible decision set $\mathbb{CP}_{\mathbb{DS}_t} = \{cp_i\mathbb{DS}^t\}$, 1,2, . . . , where the subscript $\mathbb{DS}_t$ represents a compatible decision set corresponding to the decision space $\mathbb{DS}_t$. Each $cp_i\mathbb{DS}^t$ represents a set of compatible decisions.

A sequence formed by compatible decisions from the initial moment t till the moment when all the vehicles join the platoon is referred to as a decisions sequence. A final output of dynamic platooning in an open environment is a decisions sequence with an optimal performance index selected from all possible decisions sequences, where the selected decision sequence is actually executed eventually. The optimal performance may include at least one of the minimum TTP or the minimum DTP. A construction process of a single decision sequence is shown in FIG. 4.

Figure 4:
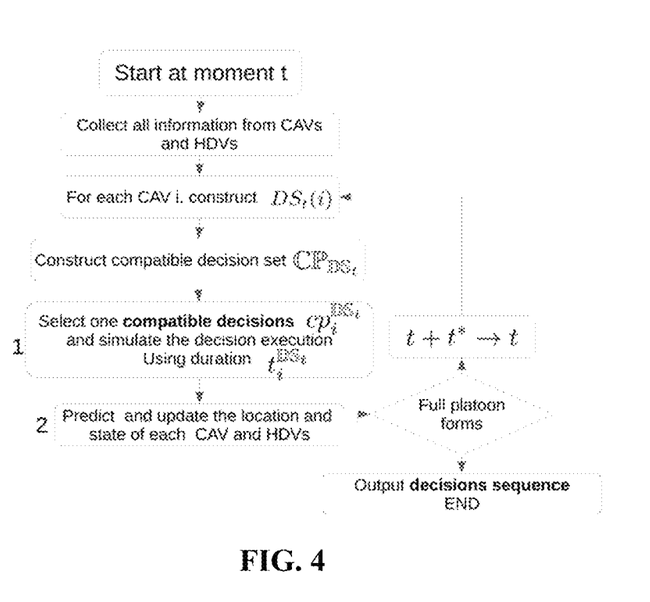
FIG. 4 shows decision sequence construction.

In FIG. 4, a block 1 represents selecting a compatible decision and simulating an execution result of the decision. It takes a period of time to execute any decision (such as LC or DGP). In the block 1 of FIG. 4, the period of time is denoted by t*. After the period of time t*, the locations and speeds of the vehicles have changed. Therefore, in a block 2, the locations and speeds at the moment t+t* need to be predicted. The prediction process is implemented using existing methods.

A principle of compatible decision screening is that all vehicles related to the decision belong to different lanes and do not conflict with each other. For example, for a CAV i and a CAV j, if the CAV i executes ALC$_j$, the CAV j definitely executes DP $_i$ and is not allowed to execute DP $_k$, k≠i. An enumeration process for constructing the compatible decisions set $\mathbb{CP}_{\mathbb{DS}_t}$ is as follows:

| | |
|---|---|
| Input | $\mathbb{DS}_t$ |
| Output | $\mathbb{CP}_{\mathbb{DS}_t}$ |
| Procedures | i=0; $\mathbb{CP}_{\mathbb{DS}_t}$ = φ |
| | While all decisions are visited: |
| | $cp_i^{\mathbb{DS}_t}$ = φ |
| | For each unvisited lane $l_i$ ∈ {$l_0$, $l_1$, ... } |
| | For each CAV j in $l_i$: |
| | For each decision d in DS(i) |
| | If d==MERGE or LC: |
| | $cp_i^{\mathbb{DS}_t}$ = $cp_i^{\mathbb{DS}_t}$∪d |
| | Label lane $l_i$ and decision d as visited; |
| | If d == DLC$_k$ or d == ALC$_k$ |
| | $cp_i^{\mathbb{DS}_t}$ = $cp_i^{\mathbb{DS}_t}$∪d∪DP $_j$ |
| | Label lane $l_i$ and lane that vehicle k is on as visited; |
| | Label decision d as visited. |
| | i=i+1; |
| | Label all lanes as unvisited. |

Figure 5:
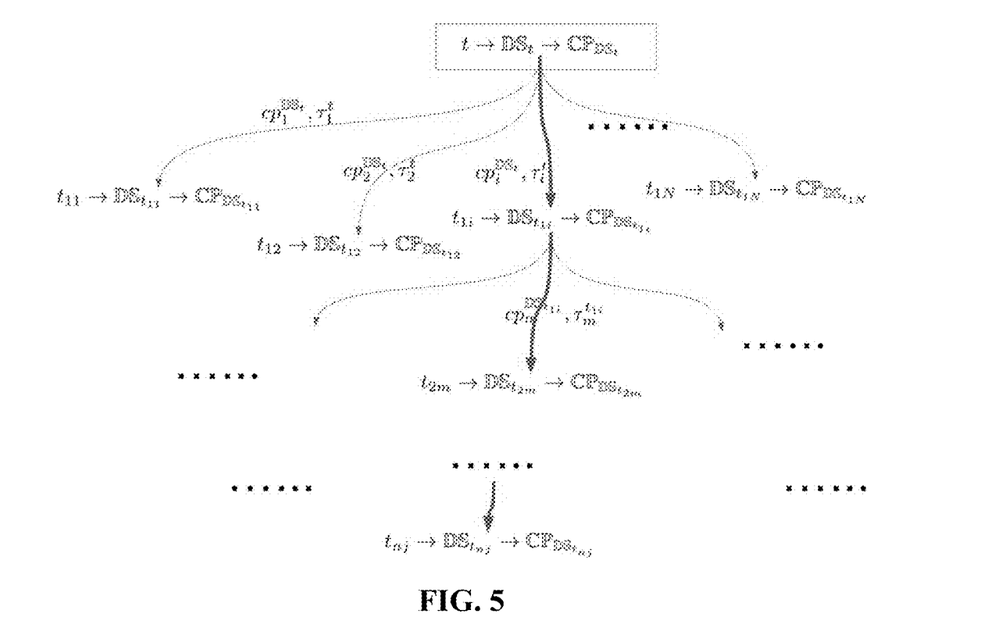
FIG. 5 shows a traversal method to construct the decision tree.

The compatible decisions set $\mathbb{CP}_{\mathbb{DS}_t}$ is obtained. It is assumed that the number of sets of compatible decisions is |$\mathbb{CP}_{\mathbb{DS}_t}$|. Then, the decision tree is constructed by circulating the process in FIG. 4. A schematic diagram of the decision tree is as shown in FIG. 5. The root node corresponds to the current moment t. After $\mathbb{DS}_t$ is constructed and $\mathbb{CP}_{\mathbb{DS}_t}$ is constructed, each compatible decision in $\mathbb{CP}_{\mathbb{DS}_t}$ is selected for branching. Each connecting line represents one compatible decision. It takes a period of time to execute each compatible decision. For example, if branch $cp_1\mathbb{DS}$ is selected, it takes a period of time $\tau_1^t$. The rest can be deduced by analogy, until all the CAVs join the platoon.

According to the decision tree, an execution path corresponding to an optimal index is selected. For example, if the branch denoted by the bold line in FIG. 5 has the shortest TTP, the branch is the optimal branch.

The lane changing feasible conditions LCF, ALC (or DLC), and DGP may be analyzed through an instance as following, to obtain the shortest time required for execution of each decision (LC, ALC or DLC, DGP). This process can be implemented using an existing technology (The related method can be found in Luo, Y, Xiang, Y, Cao, K., and Li, K (2016). A dynamic automated lane change maneuver based on vehicle-to-vehicle communication. Transportation Research Part C: Emerging Technologies 62, 87-102.; Wang, Z., Zhao, X, Xu, Z., Li, X, and Qu, X (2020). Modeling and field experiments on autonomous vehicle lane changing with surrounding human-driven vehicles. Computer-Aided Civil and Infrastructure Engineering.). A spatial trajectory and a speed curve along the spatial trajectory are modeled, so as to perform modeling analysis on the lane changing process. In the embodiment, the spatial trajectory is modeled by using an existing quintic polynomial curve, and the speed curve is modeled by using a trigonometric function.

Figure 6:
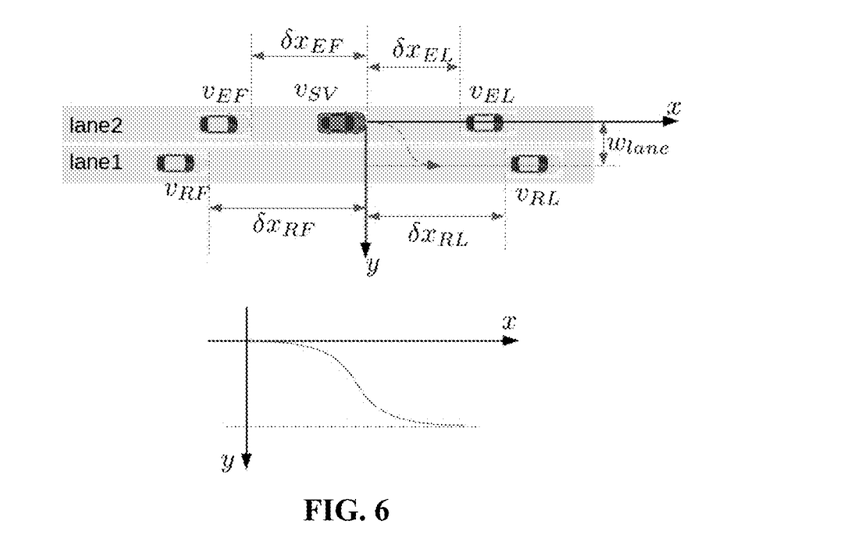
FIG. 6 shows a lane changing scenario.

First, for the LCF condition, the CAV i denoted by i LCF indicates that the vehicle can change lane directly. A direct lane changing scenario is shown in FIG. 6. The dark vehicle is a CAV, and other vehicles are HDVs or CAVs. The dark vehicle needs to change lane. For ease of description of lane change of a general CAV, vehicles are denoted by symbols with physical significance as follows: the lane changing vehicle (current vehicle) is denoted by SV (subject vehicle), a front vehicle in the same lane is denoted by EL (ego lane leader), a rear vehicle in the same lane is denoted by EF (ego lane follower), a front vehicle in an adjacent lane is denoted by RL, and a rear vehicle in an adjacent lane is denoted by RF. Speeds of the five vehicles are $v_{SV}$, $v_{EL}$, $v_{EF}$, $v_{RL}$, and $v_{RF}$. A longitudinal coordinate of the vehicle is denoted by x, and a lateral coordinate of the vehicle is denoted by y. The coordinate axis origin is located at the middle point of the front bumper of the vehicle.

The polynomial expression of the spatial trajectory of the lane changing process is as follows:

$$y(x) = b_0 + b_1 x + b_2 x^2 + b_3 x^3 + b_4 x^4 + b_5 x^5, x \in [0, x_{lc}] \quad \text{Formula 1}$$

$$\begin{cases} y(0) = b_0 = 0 & (a) \\ y'(0) = b_1 = 0 & (b) \\ y''(0) = 2b_2 = 0 & (c) \\ y(x_{lc}) = b_0 + b_1 x_{lc} + b_2 x_{lc}^2 + b_3 x_{lc}^3 + b_4 x_{lc}^4 + b_5 x_{lc}^5 = w_{lane} & (d) \\ y'(x_{lc}) = b_1 + 2b_2 x_{lc} + 3b_3 x_{lc}^2 + 4b_4 x_{lc}^3 + 5b_5 x_{lc}^4 = 0 & (e) \\ y''(x_{lc}) = 2b_2 + 6b_3 x_{lc} + 12b_4 x_{lc}^2 + 20b_5 x_{lc}^3 = 0 & (f) \end{cases} \quad \text{Formula 2}$$

In formulas, $b_0$ to $b_5$ are parameters. It is assumed that in a lane changing process of the vehicle, an initial lateral location is 0 and an initial longitudinal location is 0; at the end of lane change, the longitudinal location is $x_{lc}$ and the lateral location is lane width $w_{lane}$. Therefore, a set of equations for parameter solution is obtained, as shown in Formula 2. Exogenous variables of the set of equations include $w_{lane}$ and $x_{lc}$. In the parameter solving process, the exogenous variables may be considered as given values. However, in the process of lane change trajectory planning, $x_{lc}$ is also a decision variable. $w_{lane}$ may be considered as basically constant.

When parameters of the spatial trajectory are solved, the spatial trajectory is determined accordingly. The vehicle changes from the original lane to the target lane along the spatial trajectory. It is assumed that an initial speed of the vehicle is $v_{init}$, and a target speed thereof is $v_{final}$. Speed changes in the vehicle lane changing process are described by using a sine acceleration curve. An acceleration curve $a(t)$, a speed curve $v(t)$, and a curve of travel distance $l(t)$ are shown in the following formula:

$$a(t) = \frac{a_{max}}{2} - \frac{a_{max}}{2} \cos\left(\frac{2t\pi}{t_{lc}}\right) \quad \text{Formula 3}$$

$$v(t) = v_{init} + \frac{t a_{max}}{2} - \frac{t_{lc} a_{max}}{4\pi} \sin\left(\frac{2t\pi}{t_{lc}}\right)$$

$$l(t) = v_{init} t + \frac{t^2 a_{max}}{4} + \frac{t_{lc}^2 a_{max}}{8\pi^2} \cos\left(\frac{2t\pi}{t_{lc}}\right) - \frac{t_{lc}^2 a_{max}}{8\pi^2}$$

In the formula, $a_{max}$ is the peak value of the acceleration curve, where $a_{max} \leq a_{MAX}$. $a_{MAX}$ is a physical maximum acceleration of the vehicle, which may be generally set to 3.5 m/s². According to the acceleration curve of the trigonometric function relation, an expression of the relation between acceleration duration and a travel distance may be as follows:

$$v_{final} = v_{init} + \frac{t_{lc} a_{max}}{2} \Rightarrow t_{lc} = \quad \text{Formula 4}$$

$$\frac{2(v_{final} - v_{init})}{a_{max}} \Rightarrow t_{lc} a_{max} = 2\delta vL = l(t_{lc}) = v_{init} t_{lc} + \frac{t_{lc}^2 a_{max}}{4} L$$

$$= \frac{2 v_{init}(v_{final} - v_{init})}{a_{max}} + \frac{(v_{final} - v_{init})^2}{a_{max}} = \quad \text{Formula 5}$$

$$\frac{(v_{final})^2 - (v_{init})^2}{a_{max}} = \frac{t_{lc}(v_{final} + v_{init})}{2} \Rightarrow L a_{max} = (v_{final})^2 - (v_{init})^2$$

Parameters in the acceleration curve, the speed curve, and the distance curve satisfy the following constraints:

$$\underline{t_{lc}} < \frac{2(v_{final} - v_{init})}{a_{max}} \leq \overline{t_{lc}} \quad \text{Formula 6}$$

$$a_{MIN} \leq a_{max} \leq a_{MAX}$$

$\underline{t_{lc}}$ and $\overline{t_{lc}}$ are generally within 2 to 25 seconds according to actual data survey; $a_{MIN}$ is a physical maximum deceleration, which may be set to $-a_{MAX}$. Therefore, a lane changing curve of the vehicle is jointly determined by the spatial polynomial trajectory (Formula 1) and the trigonometric function acceleration curve (Formula 3). In addition, the relation between the travel distance l and the longitudinal coordinate x of the vehicle is as follows:

$$\begin{cases} x(t) = \mathfrak{L}^{-1}(l(t)) & (a) \\ y(t) = y(x(t)) = y(\mathfrak{L}^{-1}(l(t))) & (b) \end{cases} \quad \text{Formula 7}$$

In the foregoing formula 7, $\mathfrak{L}^{-1}(\bullet)$ is an inverse function of a travel distance-longitudinal distance function. The relation between the travel distance l and the longitudinal distance x is as follows:

$$l(x) = \mathfrak{L}(x) = \int_0^x \sqrt{1 + y'(u)^2}\, du = \quad \text{Formula 8}$$

$$\int_0^x \sqrt{(b_1 + 2b_2 u + 3b_3 u^2 + 4b_4 u^3 + 5b_5 u^4)^2 + 1}\, du$$

Therefore, real-time lateral coordinate and longitudinal coordinate are not analytical functions, and need to be solved through interpolation. A total travel distance L of lane change may be expressed as $\mathfrak{L}(x_{lc})$. When the lane width is fixed, L merely depends on $x_{lc}$. To facilitate the lane changing feasibility judgment in the following, the relation between $x_{lc}$ and L is expressed as $L = \mathbb{L}(x_{lc})$.

Figure 7:
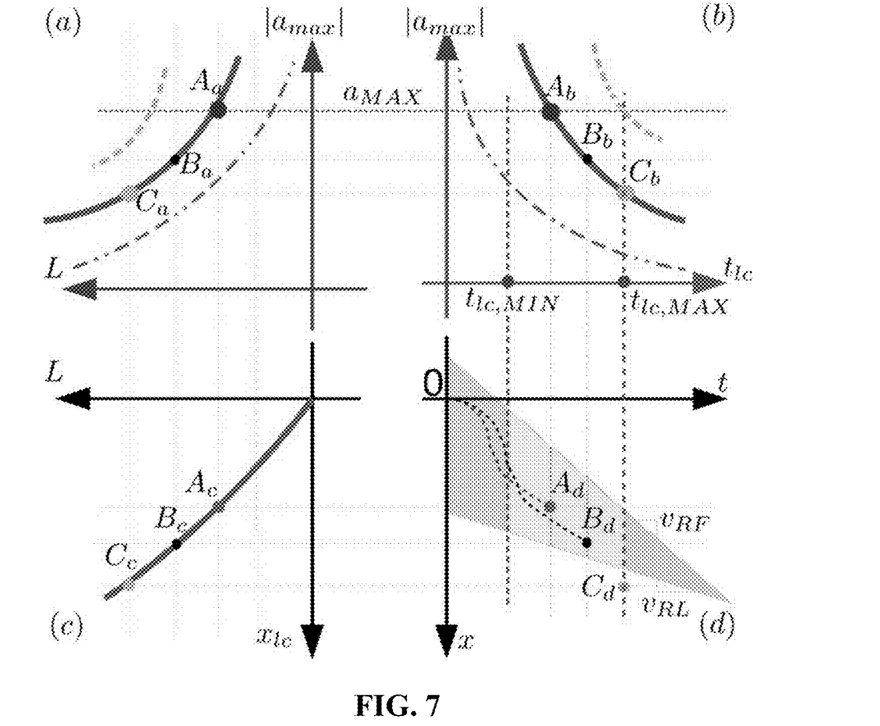
FIG. 7 shows lane changing feasibility criteria.

Speeds of Ambient vehicles $v_{SV}$, $v_{EL}$, $v_{EF}$, $v_{RL}$, and $v_{RF}$ and locations $x_{SV}$, $x_{EL}$, $x_{EF}$, $x_{RL}$, and $x_{RF}$ thereof are given, where $\min(x_{EF}, x_{RF}) < x_{SV} < \min(x_{EL}, x_{RL})$. Therefore, the current vehicle (SV) is between two vehicles in the adjacent lanes. In this case, it needs to be determined whether the current vehicle can change lane safely. In other words, it is determined whether a gap provided by the adjacent lane is large enough. There are two determination results: lane change is feasible, and lane change is infeasible. The lane changing feasibility determination may be completed according to FIG. 7. FIG. 7(a) is a curve of travel distance L-maximum acceleration $a_{max}$; FIG. 7(b) is a curve of lane changing duration $t_{lc}$-maximum acceleration $a_{max}$; FIG. 7(c) is a curve of travel distance L-lane changing longitudinal distance $x_{lc}$; and FIG. 7(d) is a real-time longitudinal displacement curve. The origin of FIG. 7(d) is the location of the current vehicle (SV). The front of the current vehicle is positive, and the rear of the current vehicle is negative.

For ease of discussion, it is assumed that only the front vehicle and the rear vehicle on the adjacent lane are considered, which have constant speeds. Trajectories of the front vehicle and rear vehicle are represented by the upper edge and lower edge of the triangle in FIG. 7(d). Slopes of the upper edge and lower edge are $v_{RL}$ and $v_{RF}$ respectively. Dynamic speed of $v_{RL}$ and $v_{RF}$ can be considered by changing the linear upper edge and lower edge to curve, which represent variable speed. If a longitudinal trajectory of safe lane change of the vehicle is in the triangle enclosed by the front vehicle and the rear vehicle, the lane change is safe. When the longitudinal trajectory of lane change of the current vehicle intersects with the boundary of the triangle or exceeds the range of the triangle, the lane change is unsafe. Meanwhile, the upper and lower limits of the lane changing duration are $t_{lc,MIN}$ and $t_{lc,MAX}$. Therefore, after the lane change, the longitudinal location of the current vehicle can only be located in a quadrangular region formed by the triangle in FIG. 7(d) and two vertical lines that come out of $t_{lc,MIN}$ and $t_{lc,MAX}$ According to Formula 4, $t_{lc}a_{max}=2\delta v$. In this specification, it is assumed that after the lane change, the vehicle has a speed the same as the front vehicle on the target lane. When there is no front vehicle on the target lane, an end speed of the vehicle is set as a speed limit of the lane. In this case, $\delta v$ is given. Therefore, when information of the ambient vehicles is given, the relation between the to-be-determined lane changing duration $t_{lc}$ and the acceleration peak $a_{max}$ is a hyperbolic curve. It is assumed that the curve is as shown by the solid line in FIG. 7(b). The curve intersects with $|a_{max}|=a_{MAX}$ at the point $A_b$, and intersects with $t_{lc}=t_{lc,MAX}$ at the point $C_b$.

Therefore, the lane changing duration and the acceleration peak of the vehicle can only be points on the curve $A_bC_b$.

According to Formula 5, $La_{max}=(v_{final})^2 (v_{init})^2$. Therefore, when ambient vehicles are given, the relation between the travel distance (spatial trajectory length) and the acceleration peak $a_{max}$ of the vehicle in the lane changing process is also described by using a hyperbolic curve. The curve is shown in FIG. 7(a), and corresponds to the curve in FIG. 7(b).

Therefore, a point $A_b$ in FIG. 7(b) corresponds to a point $A_a$ in FIG. 7(a), and a point $C_b$ in FIG. 7(b) corresponds to point $C_a$ in FIG. 7(a). When the travel distance L in the lane changing process is given, according to the relation L= $\mathbb{L}(x_{lc})$ between L and $x_{lc}$, $x_{lc}=\mathbb{L}^{-1}(L)$ can be obtained, which is shown in FIG. 7(c). In this way, any point on the curve $A_bC_b$ in FIG. 7(b) uniquely corresponds to a point on the curve $A_aC_a$ in FIG. 7(a), and uniquely corresponds to a point on the curve $A_cC_c$ in FIG. 7(c) indirectly. Thus, the longitudinal distance $x_{lc}$ of the lane changing trajectory is determined accordingly. Therefore, according to FIG. 7(a) to FIG. 7(c), parameters $t_{lc}$, $a_{max}$, L and $x_{lc}$ of the spatial-temporal trajectory for the lane change are known. Therefore, lateral and longitudinal locations at any moment can be determined through interpolation based on Formula 7. When longitudinal displacement x(t) neither intersects with the front vehicle trajectory nor with the rear vehicle trajectory, the lane change is safe. That is, the gap of the adjacent lane is large enough, or the lane change is feasible. In practical application, a safe distance for parking may be added. This is relatively simple, and is not discussed herein.

Due to numerous points on curve $A_bC_b$ in FIG. 7(b), there are numerous options for the lane changing duration $t_{lc}$ (or the peak value $a_{max}$ of the acceleration curve). For the final lane changing parameters, a unique point on the curve needs to be determined. An end point $A_b$ of the curve corresponds to the minimum lane changing duration and the maximum peak value of the acceleration curve; the other end point $C_b$ of the curve corresponds to the maximum lane changing duration and the minimum peak value of the acceleration curve. It is considered herein that SV has a trade-off between the lane changing duration and the peak value of the acceleration curve, which is expressed by parameters $w_{t_{lc}}$ and $w_{a_{max}}$. Therefore, the lane changing duration and the peak value of the acceleration curve are determined by using the following formula:

$$(t_{lc}^*, a_{max}^*) = \underset{t_{lc}, a_{max}}{\mathrm{argmin}}\ t_{lc}w_{t_{lc}} + a_{max}w_{a_{max}} \qquad \text{Formula 9}$$

Once $t^*_{lc}$, and $a^*_{max}$ are given, any detail of the lane changing trajectory is known. Therefore, the lane change feasible condition SV∥-LCF of SV can be determined. In conclusion, a process of lane change feasible decision and trajectory planning may include:

determining information of ambient vehicles, where the ambient vehicles includes: the front vehicle and the rear vehicle in the current lane, and the front vehicle and the rear vehicle in the adjacent lane, and where the target speed is $v_{RL}$, i.e., the target speed is the same as right lane leader;

determining the lane changing duration $t^*_{lc}$ and the peak value of the acceleration curve according to Formula 9;

calculating the travel distance L and the longitudinal displacement $x_{lc}$;

calculating x(t) and y(t);

determining whether safety requirements from the current vehicle to the front vehicle and rear vehicle, and to the front vehicle and rear vehicle in the adjacent lane are satisfied; and outputting a determination result of lane change feasibility (feasible or infeasible); if the lane change is feasible, outputting a time $t^*_{lc}$ required for executing the lane changing decision.

Figure 8:
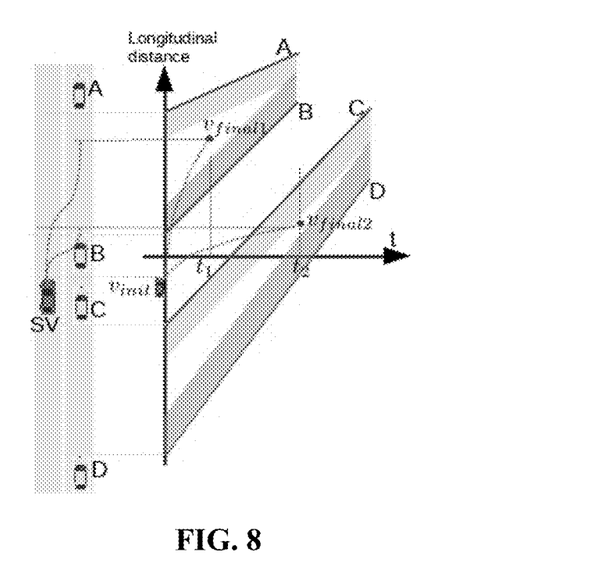
FIG. 8 shows accelerate to change lane or decelerate to change lane.

When the output of the foregoing process is that the lane change is infeasible, the vehicle needs to seek for another gap for lane change, namely, ALC or DLC in the present disclosure. The schematic diagram of such lane change is as shown in FIG. 8. A gap closest to SV is B-C, but the gap is too small. Therefore, the vehicle needs to accelerate to change the lane, to a location between the vehicle A and the vehicle B, or decelerate to change the lane, to a location between the vehicle C and the vehicle D. If the vehicle B is a CAV, the vehicle B can actively decelerate to cooperate with the lane change action of the vehicle SV. Such a lane change action is as shown in FIG. 9, that is, the vehicle B executes DGP, and the vehicle SV executes ALC.

Figure 9:
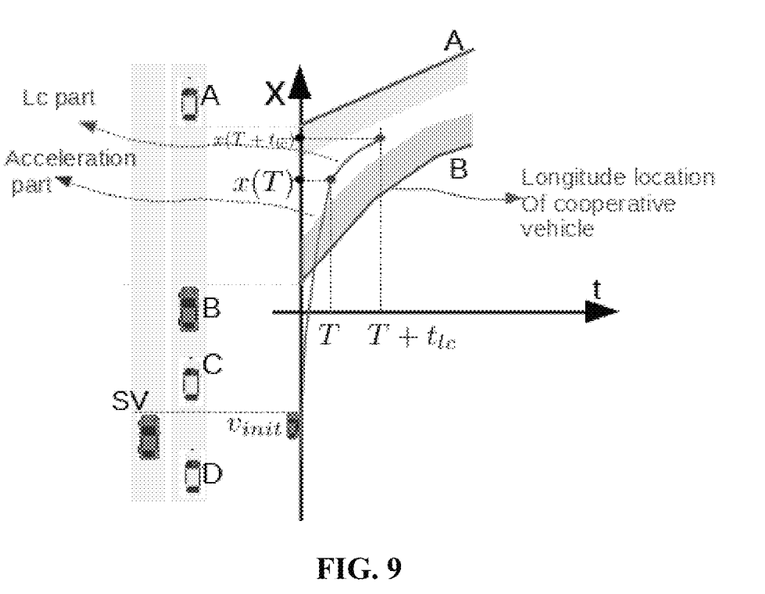
FIG. 9 shows cooperative lane changing.

The example of the cooperative lane change illustrated in FIG. 9 is analyzed below. Decision variables include a state of SV and a state of vehicle B. The state of SV may include a longitudinal trajectory $x_{SV}(t)$, a speed $v_{SV}(t)$ and an acceleration $a_{SV}(t)$ of SV, $t \in [0,T]$. The state of vehicle B may include a longitudinal trajectory $x_B(t)$, a speed $v_B(t)$ and an acceleration $a_B(t)$ of the vehicle B, $t \in [0,T]$. The speed $v_{SV}(t)$ is given, and the acceleration $a_{SV}(t)$ and the longitudinal trajectory $x_{SV}(t)$ can be obtained directly. Therefore, speed curves $v_{SV}(t)$ and $v_B(t)$ are used as decision variables. It is assumed that an optimization target is to minimize a duration for completing the lane change. In this case, the trajectory cooperative optimization can be expressed by the following formula:

Formula 4

$$\min_{v_{SV}(t), v_B(t)} J = T + t_{lc}$$

$$s.t. \begin{cases} 0 \le v_{SV}(t) \text{ or } v_B(t) \le v_{MAX} & (a) \\ -a_{MAX} \le a_{SV}(t) \text{ or } a_B(t) \le a_{MAX} & (b) \\ v_{SV}(t) = \int_0^T a_{SV}(u)du, & (c) \\ v_B(t) = \int_0^T a_B(u)du & (d) \\ x_{SV}(t) = \int_0^T v_{SV}(u)du & (e) \\ x_B(t) = \int_0^T v_B(u)du & (f) \\ SV(T) \parallel \vdash LCF & (g) \end{cases}$$

Constraints (a) and (b) are a constraint of maximum and minimum speeds, and a constraint of maximum and minimum accelerations. Constraints (c) to (f) are integrations from the acceleration to the speed, and then to the distance. Constraint (g) represents that lane change of the current vehicle SV is definitely feasible at moment T, that is, the LCF condition is satisfied.

To solve this model, time is discretized. It is assumed that time [0,T] is discrete, the discrete number is $N_T$, and a step is $$\frac{T}{N_T}.$$

Decision variables are T, $v_{SV}(k)$, $v_B(k)$, k=1,2, ... $N_T$. The acceleration is $$a_{SV}(k) = \frac{v_{SV}(k+1) - v_{SV}(k)}{T/N_T}.$$

Due to nonlinear constraints among the constraints, the constraints are used as penalty terms and added to the target function. A large enough positive number M (which may be set to $10^6$) is set, and then the penalty term corresponding to the constraint $v_{SV}(t) \ge 0$ may be expressed as $$-M \sum_{i=1}^{N_T} \min(0, v_{SV}(i)).$$

$$\min_{T, v_{SV}(k), v_B(k)} J = T + t_{lc}^* + \sum_{i=0 \sim 8} C_i \qquad \text{Formula 5}$$

In the formula 11, $$C_1 = -M \sum_{i=1}^{N_T} \min(0, v_{SV}(i));$$

-continued $$C_2 = -M \sum_{i=1}^{N_T} \min(0, v_{MAX} - v_{SV}(i));$$

$$C_3 = -M \sum_{i=1}^{N_T} \min(0, v_B(i));$$

$$C_4 = -M \sum_{i=1}^{N_T} \min(0, v_{MAX} - v_B(i));$$

$$C_5 = -M \sum_{i=1}^{N_T} \min(0, a_{SV}(i));$$

$$C_6 = -M \sum_{i=1}^{N_T} \min(0, a_{MAX} - a_{SV}(i));$$

$$C_7 = -M \sum_{i=1}^{N_T} \min(0, a_B(i));$$

$$C_8 = -M \sum_{i=1}^{N_T} \min(0, a_{MAX} - a_B(i)).$$

It is assumed that by solving the model, T* is obtained. In this case, a total time length demanded for executing DGP by the vehicle B and executing ALC by the vehicle SV is T* +$t_{lc}$. If the vehicle SV needs to execute DLC (that is, decelerate to change lane), the solution model is the same as Formula 11.

Considering the following action of the HDV, after the vehicle B executes DGP, a density of upstream vehicles of the vehicle B is compressed, while downstream vehicles of the vehicle B are not affected. In this case, the upstream HDV of the vehicle B needs to be described by an IDM following model. Because the trajectory of the vehicle B is known (which is determined according to a solution result $v_B(k)$, k=1,2, ... $N_T$ of Formula 11), the action of the vehicle i behind the vehicle B is described as follows, where the speed of the vehicle i is $v_i(t)$ and the acceleration of the vehicle i is $a_i(t)$):

$$a_i(t+\tau) = a\left[1 - \left(\frac{v_i(t)}{v_{MAX}}\right)^\delta - \left(\frac{s_i^*}{s_i}\right)^2\right] \qquad \text{Formula 12}$$

In the formula 12, $$s_i^* = s_0 + s_1 \sqrt{\frac{v_i(t)}{v_{MAX}}} + \mathcal{T} v_i(t) + \frac{v_i(t)(v_i(t) - v_B(t))}{2\sqrt{ab}}.$$

Parameter values of the IDM model may be as follows: T=1.5s, δ=4, $s_0$=2m, τ=1, a=1, b=3.2.

What is claimed is:

1. A dynamic platoon formation method under a mixed autonomous vehicles flow, wherein a platoon request is sent by performing a communication between connected autonomous vehicles (CAVs) on a multi-lane road section, and determining a target lane for platoon and a platooning scheme are determined by:
  obtaining road information and dynamic information of all vehicles, wherein the road information comprises a lane distribution, and the dynamic information of all vehicles comprises location information and speed information of each human driven vehicle (HDV) and each CAV;

selecting lanes as candidate lanes for platoon in turn;

performing a following process for each candidate lane for platoon, wherein the following process comprise: obtaining a compatible decision set after constructing a decision space for each CAV; for each compatible decision in the compatible decision set, simulating execution of the compatible decision and predicting the location information and the speed information of all the vehicles after the execution of the compatible decision; constructing a decision space for each CAV again and obtaining a compatible decision set; and continuously cycling the process to generate a decision tree of the candidate lane for platoon, wherein a root node of the decision tree is a traffic flow state at a current moment at which the platoon request is sent; each branch represents a system state transfer after the execution of each selected compatible decision; a terminal node represents a platoon formation; each branch from the root node to the terminal node represents a decision sequence in a process of the platoon formation; and an optimal decision sequence is selected according to a predetermined evaluation index; and obtaining respective optimal decision sequences corresponding to all the candidate lanes for platoon, and selecting an optimal decision sequence according to the predetermined evaluation index as a final platoon execution scheme, wherein the candidate lane for platoon corresponding to the final platoon execution scheme is a final target lane for platoon.

2. The dynamic platoon formation method under the mixed autonomous vehicles flow according to claim 1, wherein the decision space for the CAV comprises at least one of:

direct lane change (LC), which means that a current CAV directly changes to an adjacent lane at an original travel speed;

merge with an existing platoon (MERGE), which means that the current CAV is located in the target lane and only needs to merge with an existing platoon in the target lane;

accelerate lane change (ALC) or decelerate lane change (DLC), which means that the current CAV accelerates or decelerates to change to an adjacent lane; and decelerate gap provide (DGP), which means that the current CAV decelerates to provide a suitable gap for other vehicles to allow other CAVs to change lane.

3. The dynamic platoon formation method under the mixed autonomous vehicles flow according to claim 1, wherein the compatible decision set comprises a plurality of compatible decisions, each of the plurality of compatible decision comprises decisions from decision spaces for one or more CAVs, and the decisions do not conflict with each other.

4. The dynamic platoon formation method under the mixed autonomous vehicles flow according to claim 1, wherein the predetermined evaluation index is a time to platoon (TTP), which is a duration from a moment of platoon request to a moment of platoon formation.

5. The dynamic platoon formation method under a mixed autonomous vehicles flow according to claim 1, wherein the predetermined evaluation index is a distance to platoon (DTP), which is a distance traveled by a leading vehicle sending the platoon request from a moment of platoon request to a moment of platoon formation.

* * * * *